No. 868,101. PATENTED OCT. 15, 1907.
M. KUHS & G. PETIG.
DRILL CHUCK.
APPLICATION FILED JAN. 25, 1907.

Witnesses:
Edward N. Sarton
Max Zirbel

Inventors:
Max Kuhs and Gustav Petig
by Spear, Middleton,
Donaldson & Spear
Attorneys

UNITED STATES PATENT OFFICE.

MAX KUHS, OF ODERBERG, MARK, AND GUSTAV PETIG, OF BRANDENBURG-ON-THE-HAVEL, GERMANY.

DRILL-CHUCK.

No. 868,101.  Specification of Letters Patent.  Patented Oct. 15, 1907.

Application filed January 25, 1907. Serial No. 354,105.

*To all whom it may concern:*

Be it known that we, MAX KUHS and GUSTAV PETIG, citizens of the German Empire, residing at Oderberg, Mark, and Brandenburg-on-the-Havel, both German Empire, respectively, have invented a new and useful Improved Drill-Chuck, of which the following is a description.

The present invention relates to drill chucks and consists of the details of construction herein set forth and particularly pointed out in the claims.

In order to render the present specification easily intelligible reference is had to the accompanying drawing in which similar letters of reference denote similar parts throughout the several views:—

Figure 1:
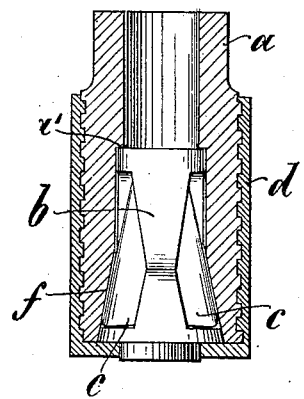
Figure 2:
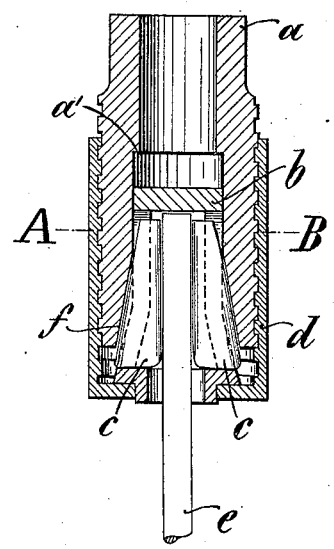
Figure 3:
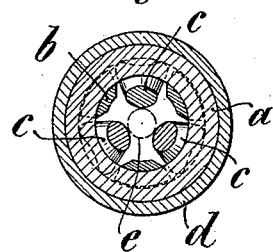
Figure 4:
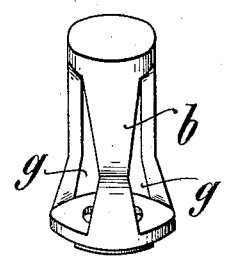

Figure 1 is a vertical section through the chuck, Fig. 2 is a similar section showing the drill clamped in the chuck, Fig. 3 is a horizontal section on line A—B of Fig. 2 and Fig. 4 is a perspective view of an internal member of the chuck.

The hollow end $a$ of the drill holder is provided with an internal shoulder $a'$, against which the top of a cage-like holder $b$ for the clamping cones $c$ may abut.

The cage $b$ is provided with lateral openings $g$ $g$ corresponding in number to the clamping cones $c$, one of which cones is adapted to lie in each opening, with the smaller end at the top as will be seen from Figs. 1 and 2.

The lower end of the holder $a$ is conically enlarged as at $f$ and the holder itself is provided with an exterior thread on which the cap $d$ is screwed, which serves to tighten up the cage $b$ in the holder.

The cones $c$ are not regular cones but are of an oval cross section and when the drill $e$ is placed between the same and the sleeve $d$ is tightened up, the said cones will be tightly wedged between the conical enlargement $f$ of the holder and the said drill, their oval or other non-circular cross section causing them to wedge and tightly clamp the drill stem, preventing it from turning in either direction. Any desired number of cones may be employed.

The present construction of chuck has the important advantage that it will serve to clamp drills of different di meter, since the play of the cones enables the space within which they will act to clamp the drill stem to be varied within wide limits.

We claim as our invention:—

1. In a drill chuck, the combination of a holder having a conical opening at one end with a series of tapering gripping members of oval cross section seated therein and means for clamping the same between the inner conical surface of the holder and the drill stem.

2. In a drill chuck the combination of a holder having a conical opening at one end with a series of tapering gripping members of oval form seated therein, a cage for the members and means for moving the cage to bring the members against the conical surface of the holder to force the members inwardly so that they will grip the drill stem.

3. In a drill chuck the combination of a holder having a conical opening at one end with a series of tapering gripping members having oval cross section seated therein, a cage-like holder having lateral orifices to receive the said members, an external screw thread on the said holder and a sleeve to undergrip the said cage-like holder and clamp the said members against the drill stem substantially as described.

In testimony whereof we affix our signature in the presence of two witnesses.

MAX KUHS.
GUSTAV PETIG.

Witnesses:
 HENRY HASPER,
 WOLDEMAR HAUPT.